UNITED STATES PATENT OFFICE.

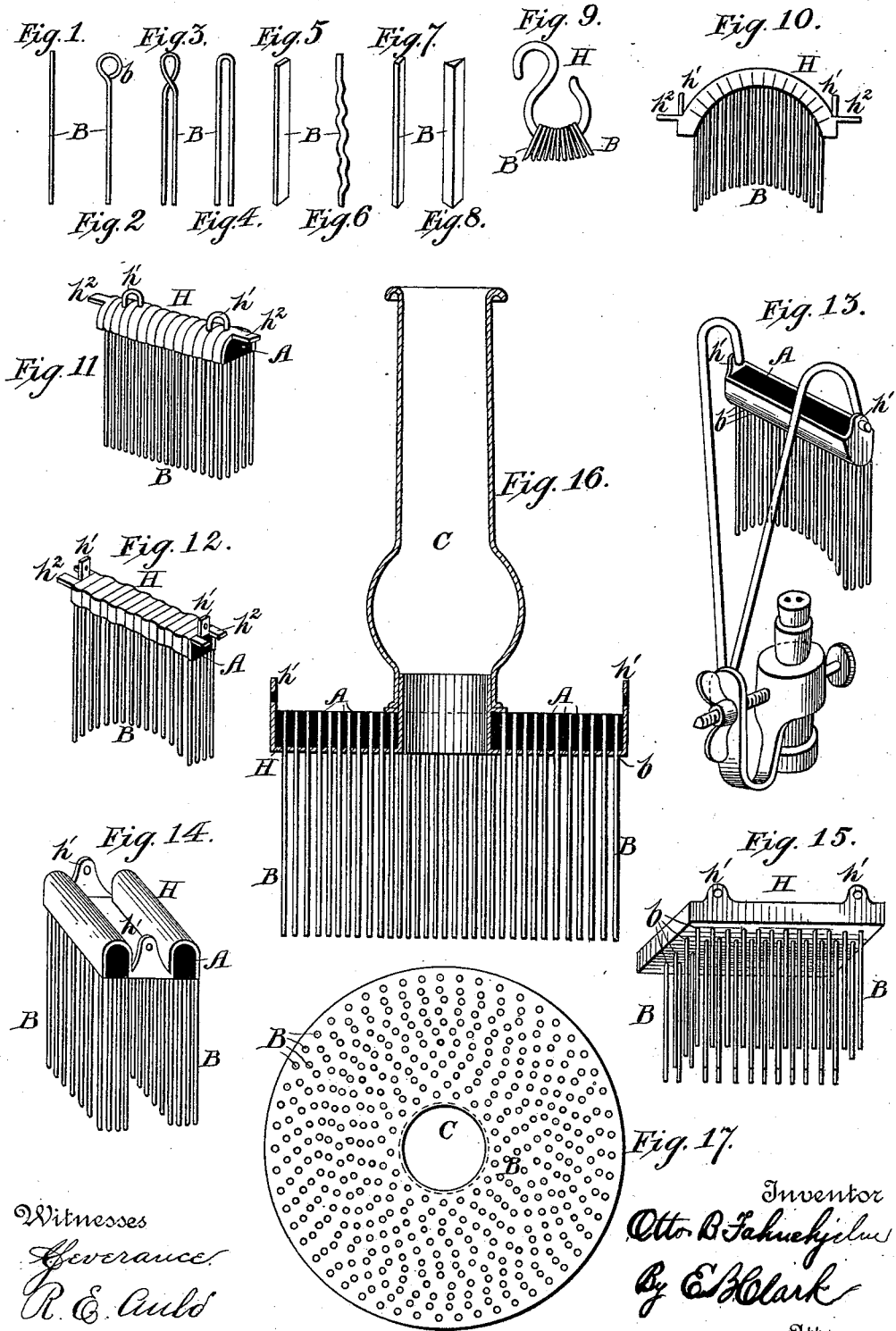

OTTO BERNHARD FAHNEHJELM, OF STOCKHOLM, SWEDEN, ASSIGNOR, BY MESNE ASSIGNMENTS, TO THE FAHNEHJELM INCANDESCENT GAS LIGHT COMPANY, OF CHICAGO, ILLINOIS.

INCANDESCENT.

SPECIFICATION forming part of Letters Patent No. 450,123, dated April 7, 1891.

Application filed August 4, 1884. Serial No. 139,649. (No model.) Patented in Germany November 17, 1883, No. 29,498; in Belgium November 30, 1883, No. 63,217; in England December 12, 1883, No. 5,646; in Austria-Hungary January 15, 1884; in France February 5, 1884, No. 158,572; in Italy February 10, 1884, No. 16,377, and in Sweden March 20, 1884.

*To all whom it may concern:*

Be it known that I, OTTO BERNHARD FAHNEHJELM, a subject of the King of Sweden, residing at Stockholm, in Sweden, have invented certain new and useful Improvements in Incandescents, (for which I have obtained Letters Patent in Great Britain, No. 5,646, dated December 12, 1883; in Belgium, No. 63,217, dated November 30, 1883; in France, No. 158,572, dated February 5, 1884; in Italy, No. 16,377, dated February 10, 1884; in Sweden, dated March 20, 1884, said Swedish patent bearing no number; in Germany, No. 29,498, dated November 17, 1883, and in Austria-Hungary, dated January 15, 1884, but not numbered;) and I do hereby declare the following to be a full, clear, and exact description of the invention.

The object of this invention is to furnish an appliance by which to create a merchantable light by rendering luminous a refractory body or bodies heated to incandescence in gas-flames, and to supply such an arrangement and adjustment of suitable refractory materials as will furnish a satisfactory light with the use of the ordinary flame of fuel-gas.

Distinguishing features of my invention as compared with devices heretofore proposed for producing an incandescent gas-light are that my incandescing bodies are of attenuated forms, such as needles or lamellæ, and are arranged in groups in proper relation to the burner to be subjected to the flame and to disturb the free burning thereof to the least possible extent, the tips or free ends of such needles or lamellæ being in different planes and conforming in contour to the heating zone of the flame to which they are subjected.

In carrying out my invention I preferably employ highly-refractory porous bodies capable of withstanding the high temperature required for purposes of illumination by incandescence, and capable of being obtained in an attenuated form by molding or otherwise, in order to bring such bodies rapidly to a state of incandescence. To these ends I employ refractory substances or oxides, capable of being converted to a plastic state, and when in this state of being formed or molded into needles, lamellæ, or other bodies of attenuated form, a number of which may be assembled in a group and suspended or held in the proper relation to a gas-flame of the proper temperature, preferably water-gas.

Any suitable substance of sufficient refractory power and capable of being converted into a plastic state or condition may be employed—as, for instance, magnesia, lime, oxide of zircon, or other analogous or refractory substances or oxides. I prefer the magnesia, owing to the beautiful light obtained when brought to a state of incandescence; and in the preparation of the incandescing bodies I use magnesia alba (carbonate of magnesia) or a magnesite or dolomite rich in magnesia, whether calcined or not, chiefly on account of the property above referred to, and also on account of the comparatively low cost of the material, its low hygroscopic properties, and of the fact that it is not readily affected by atmospheric changes, and finally its durability while subjected to high temperature. I first reduce the refractory substance or oxide to a powder, then add thereto sufficient water or other fluid to form a plastic mass capable of being molded or formed into proper shape.

For purpose of illumination, it is desirable that the incandescing body should be of such form as to be rapidly brought to a state of incandescence when subjected to the heat of a gas-flame. To this end I subdivide the refractory body as much as possible, and by compression or otherwise I impart thereto such form and dimension as will adapt said body to be rapidly brought to a state of incandescence. Any suitable means may be employed to impart to said bodies the desired form—as, for instance, by forcing the plastic mass through suitable dies or molds, by means of which such bodies may be obtained in practically continuous strings or strips, and such bodies may then be corrugated or an undulating form imparted thereto, if desired, by placing such strips between suitable molds or otherwise. As the shaped material leaves the die or mold it is cut into suitable lengths for use as an incandescing body.

Owing to the slight cohesive properties of the refractory substances or oxides referred to, and owing to their attenuated condition after leaving the die or mold or after being shaped, they are very difficult to handle without breaking. To avoid this, I preferably use an organic adhesive agent to impart to the plastic mass greater cohesiveness. Various adhesive substances may be employed—as, for instance, starch, gelatine, gum-arabic, or other vegetable or animal adhesive substance—such substance being dissolved in the water or other fluid employed to reduce the powdered refractory substance or oxide into a plastic mass. The bodies so produced may then be dried and assembled in groups in suitable holders for suspension in the gas-flame. I prefer, however, to bake or calcine the bodies, instead of air-drying the same, by subjecting them to a temperature sufficiently high to burn out the organic matter, (gum, starch, &c.,) and eliminate the moisture and carbonic acid.

By adding an organic substance to the refractory material and then destroying or eliminating the same therefrom by heat, I obtain a body of greater cohesiveness, hence greater strength, and a body that will be porous, according to the quantity of organic matter added thereto and eliminated therefrom. Such body is brought to a state of incandescence very readily. Any two or more of the refractory substances above described may be combined in any desired proportions in the formation or production of the incandescing bodies. After these attenuated refractory bodies have been calcined and allowed to cool they are assembled into groups by securing them to suitable holders. The form of these holders, as also to some extent the form of the refractory bodies, will depend upon the character of the burner employed. Of course it will be understood that the powdered refractory substance, instead of being rendered plastic, may, in a dry state, be converted into attenuated bodies by the application of powerful pressure. I prefer, however, to adopt the mode first described.

I have shown in the accompanying drawings several modes of uniting or grouping the attenuated refractory bodies into a compact form adapted to the flame of different burners.

Figures 1 to 8, inclusive, show various forms of refractory bodies; and Figs. 9 to 17, inclusive, represent various forms of holders to which such bodies are secured, the needles in Fig. 9 being broken away.

The attenuated refractory body B may be of cylindrical form in cross-section, as shown in Fig. 1, and such body may have an eye $b$ formed at one end, as shown in Fig. 2; or it may be doubled and twisted to form a loop at one end, as in Fig. 3, or bent into U form, as in Fig. 4, for suspending such bodies in a group or bunch from a holder H, of the nature of that shown in Fig. 9, where the free ends of the attenuated bodies when suspended from such holder lie in an arc of a circle in proper relation to the gas-flame.

Instead of bodies cylindrical in cross-section, bodies of other form may be employed—as, for instance, lamellæ, as shown in Fig. 5, which lamellæ may be corrugated, as shown in Fig. 6, and instead of forming the corrugations transversely said corrugations may be formed longitudinally.

As shown in Figs 7 and 8, bodies of square or prism shape in cross-section may be employed, the form of the body, as well as the manner of grouping the same, depending in a measure on the intensity of the light it is desired to obtain from a single gas-flame or a plurality of flames, and on the volume of gas consumed as well as on the nature of the burner—that is to say, on the configuration of the flame as produced by the burner. Whatever the shape of the cross-section of the body, such body should in all instances, however, be attenuated.

The mode of suspending the bodies B from a holder, as shown in Fig. 10, will answer for an ordinary bat-wing or fish-tail burner, the free ends of the groups of bodies corresponding nearly to the form of the heating-zone of the flame.

Figs. 11 and 13 show U-shaped holders and Fig. 12 a rectangular holder. In Fig. 11 the free ends of the bodies B all lie in the same plane, and in Figs. 12 and 13 the said ends are arranged to describe the arc of a circle, as in Fig. 10.

In Fig. 14 I have shown a double holder whereby a comparatively large number of such attenuated bodies may be assembled in parallel rows for double parallel flames or rows of flames.

In Fig. 15 I have shown a rectangular holder in which a series of parallel rows of refractory bodies may be grouped, and finally in Figs. 16 and 17 I have shown a cylindrical holder in which the bodies are grouped in concentric rows. The latter holder is provided with a central aperture and combined with a chimney C to increase the draft and promote the combustion of the gas used, as more plainly shown in Fig. 16, which shows the holder in section.

I preferably arrange parallel rows of refractory bodies, needles, or lamellæ, in a holder adapted for use with a single burner, and such parallel rows are placed a short distance apart. The parallel rows of needles are preferably held in such relation to a single burner that their axes are substantially parallel with the axis of such burner, and that the flame thereof shall play in the space between the rows, whereby the free burning of such flame shall be disturbed to the least possible extent.

It is obvious from what has been said above that many forms of refractory bodies and holders may be employed in order to obtain the greatest amount of light from a given burner with the least consumption of gas; therefore I do not confine myself to any of the forms or arrangements described herein. The refractory bodies may be secured to the holders by filling them with a plastic material, into which the bodies are inserted or embedded and securely held. Any suitable non-combustible material having the described properties may be employed—as, for instance, common clay or fire-clay or other refractory substance or cement.

As shown in Figs. 10, 11, 12, and 14, the cementing material A faces the gas-flame. This arrangement may be reversed, as in Figs. 3, 5, 6, and 17, the holders being here provided with the requisite number of perforations b, through which the bodies B are inserted, and in this case the cementing substance may be placed in a trough and allowed to set around the extremities of the bodies projecting within the holder H.

To prevent the cementing material from detaching itself from the holder by reason of shrinkage in drying or setting, especially when employed in a plastic form, the sides of the holder may be slitted and bent to prevent the same from escaping even after the cementing material has shrunk, or the holder may be corrugated, as in Figs. 11 and 12, or the inside faces of the holder may be roughened, or other means adopted to prevent the cementing material from becoming detached from the holder.

Each holder H is provided with appliances, perforated lugs, loops or hooks, &c., $h'$ and $h^2$, or other means for suspending or holding the same in proper position in the gas-flame, and these holders are preferably struck from sheet metal, though they may be made of any other suitable material.

I do not desire to claim herein the specific devices for suspending the incandescing bodies and adjusting the same to the burners which I have described and claimed in Letters Patent Nos. 312,452 and 332,650; nor do I desire to claim herein any method of illumination, as such is described and claimed in my application for patent filed on or about December 26, 1883, and bearing Serial No. 115,500.

Having now described my invention, what I claim, and desire to secure by Letters Patent, is—

1. An incandescing body composed of a series of attenuated mineral refractory needles or lamellæ having their tips or free ends which are to be subjected to heat arranged in different planes, substantially as described.

2. The combination, with a gas-burner, of an incandescing body composed of a series of mineral refractory needles or lamellæ having their tips or free ends which are to be subjected to heat arranged in different planes and conforming in contour to the heating-zone in the burner-flame, as described.

3. The combination, with a gas-burner, of an incandescing body composed of a series of attenuated mineral refractory needles or lamellæ arranged in parallel rows a short distance apart and with their axes substantially parallel with the axis of the burner, and adapted to permit the flame of said burner to play in the space between the rows, substantially as described.

4. The combination, substantially as described, of a series of refractory needles or lamellæ, a holder in which one end of said needles or lamellæ is secured, said holder having an axial aperture, and a chimney applied to said aperture, as described.

In testimony whereof I affix my signature in presence of two witnesses.

OTTO BERNHARD FAHNEHJELM.

Witnesses:
F. VOGLEER,
J. GRUND.